United States Patent [19]

Martin

[11] E Patent Number: Re. 33,449

[45] Reissued Date of Patent: Nov. 20, 1990

[54] HELICALLY GROOVED FOAM FOOTBALL

[76] Inventor: Rod G. Martin, 1588 English Dr., San Jose, Calif. 95129

[21] Appl. No.: 424,852

[22] Filed: Oct. 20, 1989

Related U.S. Patent Documents

Reissue of:

[64] Patent No.: 4,772,020
Issued: Sep. 20, 1988
Appl. No.: 121,317
Filed: Nov. 16, 1987

U.S. Applications:

[63] Continuation-in-part of Ser. No. 897,170, Aug. 15, 1987, abandoned.

[51] Int. Cl.[5] ..... A63B 43/02; A63B 37/14; A63B 37/06

[52] U.S. Cl. ..... 273/65 EE; 273/65 EG; 273/DIG. 20

[58] Field of Search ..... 273/65 EG, 65 EF, 65 EE, 273/65 E, 65 R, 58 A, 55 R, 55 B, DIG. 20

[56] References Cited

U.S. PATENT DOCUMENTS

| | | | |
|---|---|---|---|
| 1,931,429 | 10/1933 | Buckner et al. | 273/65 EG |
| 2,194,674 | 3/1940 | Riddell | 273/65 EG |
| 3,884,466 | 5/1975 | MacDonald et al. | 273/65 EC |

FOREIGN PATENT DOCUMENTS

| | | |
|---|---|---|
| 583557 | 9/1957 | Canada . |
| 578533 | 6/1959 | Canada . |

OTHER PUBLICATIONS

"Sports Illustrated", Jan. 7, 1980, p. 4.
Parker Brothers, Nerf Turbo Football advertisements, Published in Playthings, Feb. 1989.

*Primary Examiner*—George J. Marlo
*Attorney, Agent, or Firm*—Skjerven, Morrill, MacPherson, Franklin & Friel

[57] ABSTRACT

An elastic foam football 10 with lengthwise spiral grooves 20 increasing in width and depth towards the middle of the ball for improved handling.

6 Claims, 2 Drawing Sheets

HELICALLY GROOVED FOAM FOOTBALL

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of my copending application, Ser. No. 897,170, filed Aug. 15, 1987, now abandoned.

BACKGROUND

This invention relates to elliptical footballs, and more specifically to a soft, lightweight, easier handling and safer football.

Oval footballs must be gripped lengthwise to be thrown correctly, which may be difficult for those with small hands. Conventional football lacing is often inadequate for a grip. Several prior art football designs improve handling with surface texturing or spiral ribs, which may also stabilize spinning passes.

In U.S. Pat. No. 1,931,429, spiral grooves in an inflatable leather football are filled flush with an abrasive compound to increase surface friction. U.S. Pat. No. 2,194,674 describes a football with spiral cords wound around a "rubberized canvas carcass", which is inflated by a bladder, wherein the cords project through a leather casing to form ribs. An inflatable football is described in Canadian patent No. 578,533 with diagonal ribs (FIG. 10 of Canadian patent) for enhanced gripping similar to that described above in U.S. Pat. No. 2,194,674. U.S. Pat. No. 3,884,466 describes a molded plastic football with an axial air passage, straight grooves outside, and weights inside to stabilize flight trajectories. These inflatable leather covered or molded plastic footballs are heavy, hard, and unsatisfactory for childrens' use.

U.S. Pat. No. 3,119,618 describes a football with subsurface sponge padding which compresses for a better grip. U.S. Pat. No. 4,241,918 describes a solid football with a core of soft polyester batting and a plastic casing including simulated lacing to assist gripping.

Solid foam rubber, or "NERF" type footballs, for example the Model 777 Cosom football, are softer, lighter, and easier to grip and throw. These footballs do not gain the momentum to travel as far as conventional inflatable footballs, and, thus, minimize the risk of injury or property damage.

SUMMARY

It is an object of this invention to provide a soft, lightweight, better handling and safer football. The invention achieves this object in an elastic foam football with spiral lengthwise grooves which increase in depth towards the middle of the football. The grooves make the ball easier to hold, throw, and catch, and have a rifling effect to stabilize passes.

DETAILED DESCRIPTION

Figure 1:
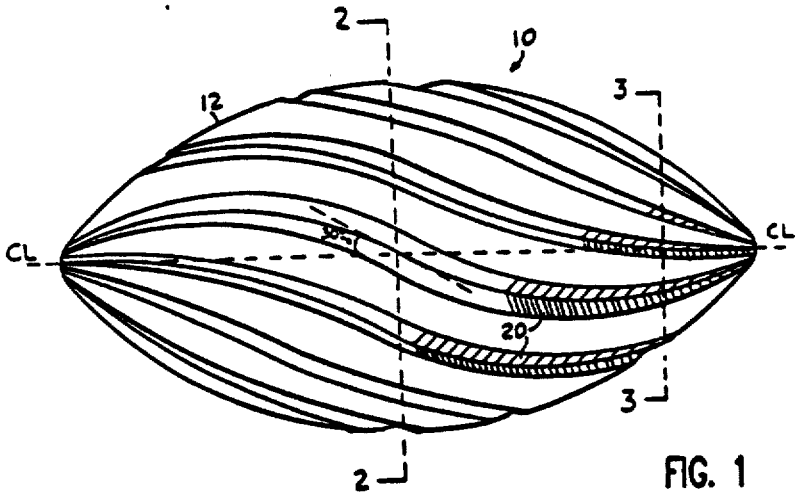
FIG. 1 is a side view of a football in accordance with the invention.

Referring to FIG. 1, a one piece molded elliptical type football 10 of, for example, polyurethane, foam rubber, or other type of soft, lightweight elastic foam, weighing approximately 0.3 lbs, has preferably twelve equally spaced elliptic-helical grooves 20 in its surface. Football 10 has a selected nominal length of approximately 9⅜ inches and a nominal maximum outside diameter of approximately 5 9/16 inches.

Figure 2:
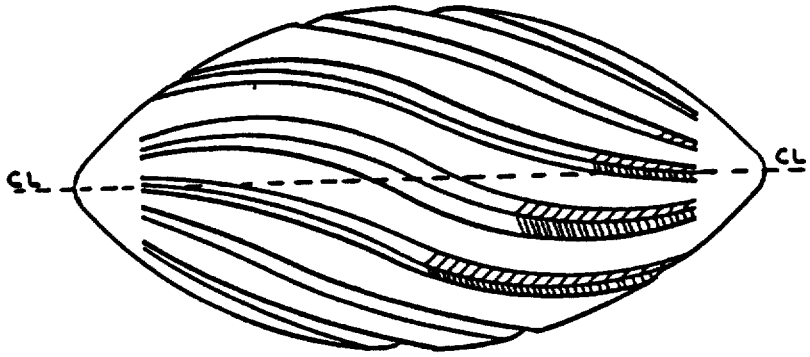
FIG. 2 is a side view of a football in accordance with an alternative embodiment.

Grooves 20 are deepest in the middle of football 10, the football's maximum diameter, for better gripping at the larger diameter. In the preferred embodiment, the grooves become narrower and shallower towards the ends of football 10 and extend to each end of football 10, as shown in FIG. 1. In an alternate embodiment, the grooves end at a distance from each end of football 10, as shown in FIG. 2. The grooves centered depth at the maximum diameter of the football is in the range of 0.2 to 0.3 inches, with the width of the grooves at the maximum diameter of the football being in the range of 0.4 to 0.6 inches.

Figure 3:
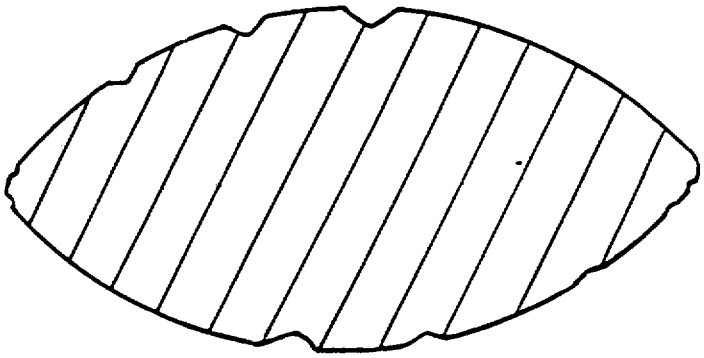
FIG. 3 is a cross-sectional view of the football of FIGS. 1 and 2, showing the football bisected along its major axis perpendicular to line 2—2.
Figure 4:
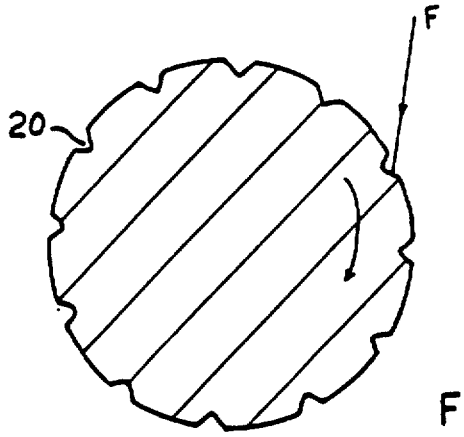
FIG. 4 is a cross-sectional view along line 2—2 in FIG. 1.
Figure 5:
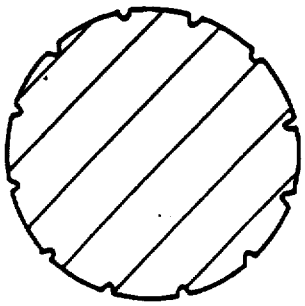
FIG. 5 is a cross-sectional view along line 3—3 in FIG. 1.

FIG. 3 shows a cross-section of the football of FIGS. 1 and 2 bisected along its major axis perpendicular to line 2—2, illustrating that the football of FIGS. 1 and 2 is of solid foam construction. FIGS. 4 and 5 illustrate that the grooves become narrower and shallower towards the ends of football 10, with FIG. 4 showing a cross-section of football 10 in FIG. 1 along line 2—2, and FIG. 5 showing a cross-section along line 3—3.

Figure 6:
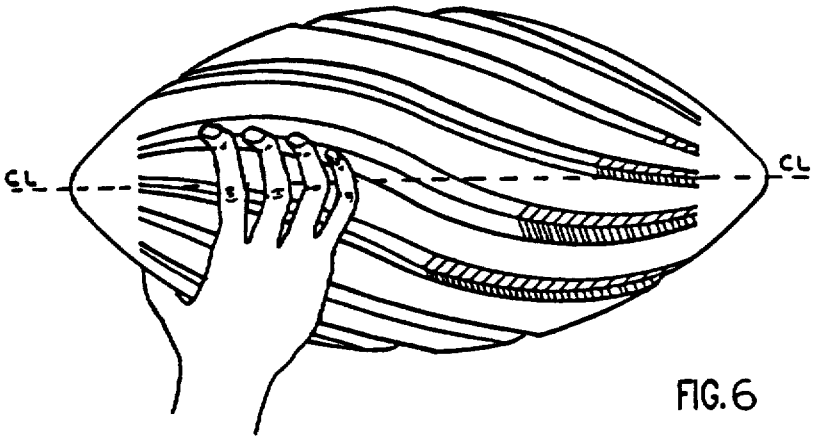
FIG. 6 shows a child's hand grasping the football of FIG. 2.

Grooves 20 preferably have a rounded V shape, as shown in FIGS. 4 and 5, with a helical curvature of approximately twelve degrees per inch along centerline CL, and are at an angle of approximately 30° to centerline CL at the major diameter 2—2, as shown in FIG. 1, for conformance to the placement of fingers when gripping football 10. Grooves 20 differ from the prior art ribs and abrasives used to enhance gripping of a football in that grooves 20 are wide enough and deep enough for a child's fingertips, and most adults' fingertips, to enter a groove and, thus, enable a higher degree of gripping than prior art ribs or abrasives. The twelve grooves 20 enable firm gripping of the football with a broad range of hand sizes, wherein the fingertips are placed in one groove, as shown in FIG. 6, and the tip of the thumb is placed in another groove. With the cited prior art footballs, a small child's fingertips could not exert sufficient gripping pressure to maintain an adequate grip for throwing the football. Grooves 20 thus provide for fingertips to more easily, more quickly, and more securely grip football 10. This results in more forceful, longer, and better passes and easier receiving and carrying than prior art footballs.

FIG. 4, showing a cross-section of football 10 in FIG. 1 along line 2—2, serves to illustrate the increased rotational force capable of being applied to football 10, resulting in more accurate passes. Force F, applied by fingers gripping football 10, is applied downward essentially perpendicular to a wall of one of the rounded V-shaped grooves 20. As is apparent, the force F applied to the side of a groove does not require much friction to rotate football 10 in a clockwise direction, since force F is almost perpendicular to the side of the groove. If force F was not applied to a wall of a groove but to the round surface of football 10, a number higher degree of friction would be required to impart a rotation to football 10. This higher degree of friction requires a stronger grip on football 10, which children may be lacking. This problem with prior art footballs is exacerbated by the fact that a football should be thrown at, or close behind, its center diameter, which is the widest and most difficult place to grasp a regular shaped football. When football 10 is thrown with a spinning motion, flight is also stabilized by grooves 20 in surface 12 acting as rifling or fins. This permits more consistent and accurate passes.

A preferred and alternative embodiment of the irvention have been illustrated. Modifications and adaptations within the scope of the invention will occur to those skilled in the art. The invention is limited only by the scope of the following claims.

I claim:

1. A solid foam football having a major axis and an outer surface, wherein helical grooves are disposed in said outer surface in the direction of said major axis for the placement of fingertips thereinto to improve gripping and passing of said football, said helical grooves having a maximum depth in the range of 0.2 to 0.3 inches and a maximum width in the range of 0.4 to 0.6 inches, said helical grooves becoming shallower and narrower towards its ends, and wherein the angles of any of said helical grooves with respect to said major axis correspond generally to the placement of fingertips on said football when gripping said football for passing.

2. The football of claim 1 wherein said grooves end at a margin from the ends of the football.

3. The football of claim 1 wherein each of said helical grooves comprise two essentially flat walls forming a V shape with a concave bottom.

4. The football of claim 3 wherein the angle of said grooves with respect to said major axis at the maximum diameter of said football is approximately 30°.

*5. A solid foam football having two ends and an outer surface, wherein helical grooves are disposed in said outer surface in the direction of a major axis extending between said two ends, said helical grooves being wide enough and deep enough for a passer's fingertips to enter said grooves a significant distance which is sufficient to significantly improve gripping and passing of said football, said helical grooves becoming shallower and narrower towards the ends of said football, and wherein the angles of all of said helical grooves with respect to said major axis correspond generally to the placement of fingertips on said football when gripping said football for passing.*

*6. The football of claim 5 wherein said grooves are arranged such that a passer's fingertips may be placed in one of said grooves and a tip of said passer's thumb may be placed in another of said grooves for improved gripping and passing of said football.*

* * * * *

UNITED STATES PATENT AND TRADEMARK OFFICE

CERTIFICATE OF CORRECTION

PATENT NO. : RE. 33,449

DATED : November 20, 1990

INVENTOR(S) : Rod G. Martin

It is certified that error appears in the above-identified patent and that said Letters Patent is hereby corrected as shown below:

Correct on the title page, item [63], directed to "Related U.S. Patent Documents, U.S. Applications," to read: --Continuation-in-part of Ser. No. 897,170, August 15, 1986, abandoned.--

Signed and Sealed this

Eighth Day of September, 1992

*Attest:*

DOUGLAS B. COMER

*Attesting Officer*

*Acting Commissioner of Patents and Trademarks*